May 28, 1968  J. B. ANDERSON  3,385,022
METHOD AND APPARATUS FOR ASEPTICALLY FILLING DRUMS
Filed Jan. 13, 1966  2 Sheets-Sheet 1
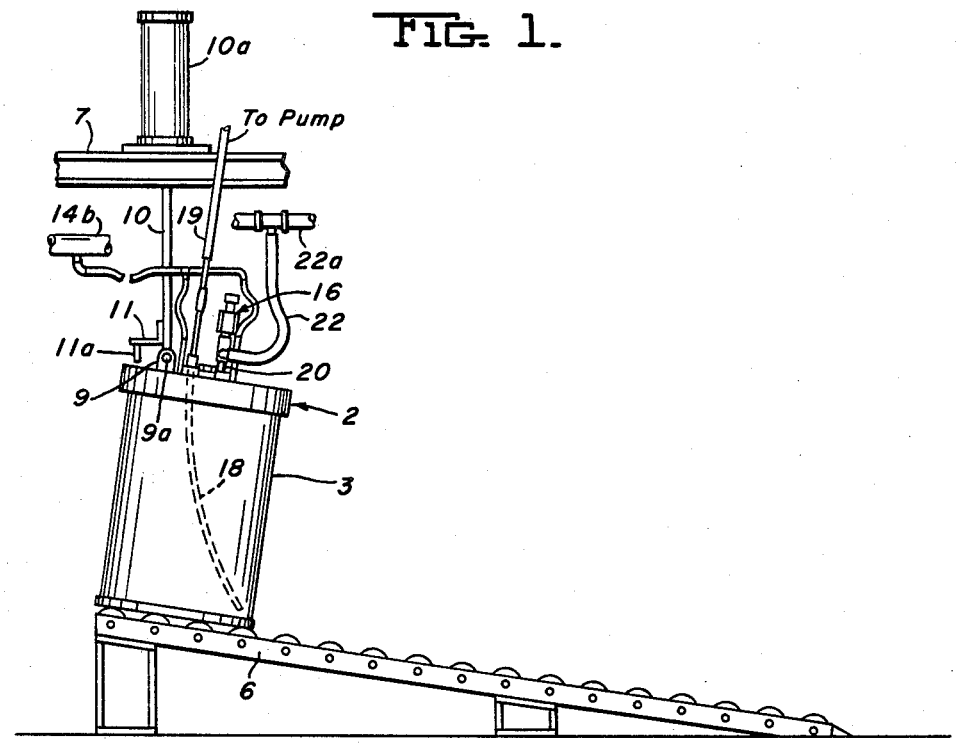
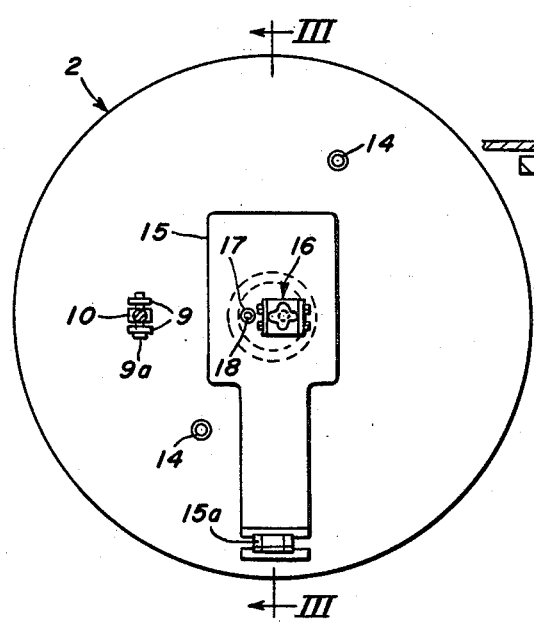
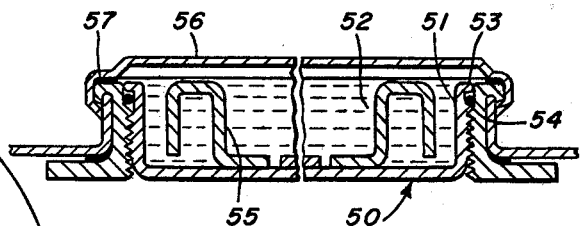
INVENTOR.
JAMES B. ANDERSON
BY
Christy, Parmelee,
Strickland
Attorneys

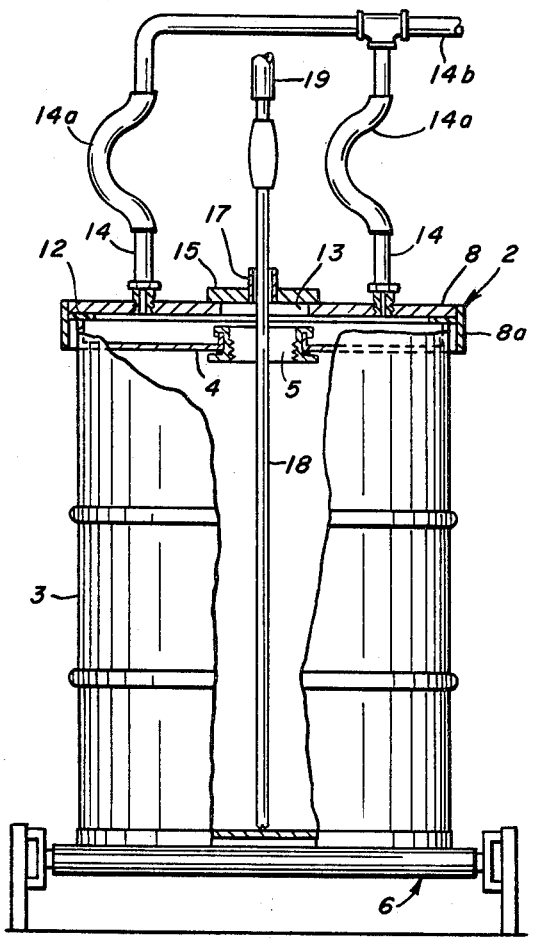
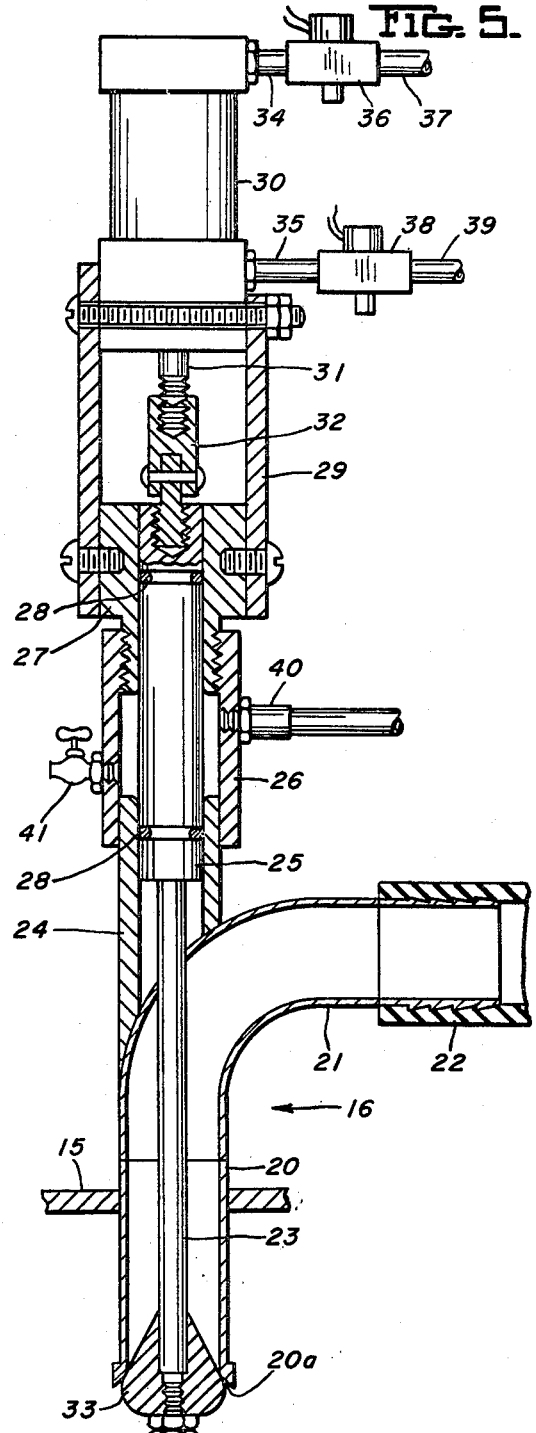
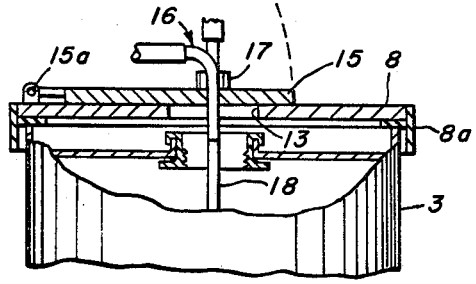

ated May 28, 1968

United States Patent Office 3,385,022
Patented May 28, 1968

3,385,022
METHOD AND APPARATUS FOR ASEPTICALLY FILLING DRUMS
James B. Anderson, Mount Lebanon Township, Allegheny County, Pa., assignor to H. J. Heinz Company, Pittsburgh, Pa., a corporation of Pennsylvania
Filed Jan. 13, 1966, Ser. No. 536,236
10 Claims. (Cl. 53—11)

This invention relates to the preservation for both transportation and storage of perishable liquids and semi-liquids in drums, such as metal shipping drums.

The present invention is particularly applicable to the food industry and will be hereinafter specifically described in that connection, but may find utility in other fields where liquids, purees, pastes, etc. must be stored in drums and protected from spoilage.

In the food industry many fruits and vegetables must be harvested in season and immediately reduced to a flowable pulp, paste, puree, juice or other liquid or semi-liquid flowable condition. In some cases such products may be thereafter used throughout the year either where initial processing takes place, or at some remote plant where they are used in the preparation of finished food products, or repacked, as the market demands, into individual small containers for retail distribution.

Various attempts have been made to pack such products in large steel shipping drums, such as fifty gallon drums, but so far as I am aware this has not proved economically or commercially feasible. While such fruit or vegetable substances are usually processed by cooking at a sterilizing temperature, prolonged heating is detrimental to color or flavor. Such materials can be filled into small cans or containers such as are used in retail trade while they are still at a temperature such that they can be aseptically sealed without difficulty, since relatively small amounts in tins or jars will cool quickly. However, in large containers, such as fifty gallon drums, the rate of cooling is so gradual and the heat retained for such length of time that it is only practical to cool the product to approximately room temperature before it is put into the drums. Once the product has been cooled, it is readily contaminated by air-borne organisms, so that great care must be taken to avoid any contact with air, and methods and apparatus heretofore developed are so elaborate and expensive as to limit their extensive use in commercial operations.

While it might be presumed that the drum could simply have steam supplied to the interior of the drum and the sterile product discharged into the steam-filled drum, the cold product spraying into an atmosphere of steam makes a very effective condenser, and an undesirable amount of water is thus introduced into the product. This of course is objectionable for economic reasons, but in many cases the natural acidity of the product is an important factor in preventing spoilage as, for example, in tomato concentrate, but the condensation of water which will normally accumulate on top of the product forms a pool of low acidity in which organisms resistant to heat can develop and promote spoilage, because the water lacks the required acidity. Aside from this, the heat absorbed by condensation of the steam heats the product to an undesirable extent, plus the fact that too rapid condensation may cause air to be drawn into the drum.

The present invention is for a method and apparatus by which drums may be aseptically filled with a sterile product of this kind with the product at room temperature and utilizing steam to sterilize the drums and maintain a sterile atmosphere without excessive condensation.

The invention has for its object, therefore, to provide a unique and practical method of and apparatus for the aseptic filling of the drums and sealing them while eliminating difficulties heretofore encountered in the industry.

A further object of the invention is to provide a method and apparatus for this purpose which is relatively simple and inexpensive, and the operation of which can be carried on with little risk of contamination of the product.

These and other objects and advantages are secured by this invention which may be more fully understood by reference to the accompanying drawings, in which:

FIG. 1 is an elevation of a single drum filling unit showing a drum in place to be filled;

FIG. 2 is an end elevation of FIG. 1 on a slightly larger scale, the drum of course being at right angles to the position shown in FIG. 1;

FIG. 3 is a section in the plane of line III—III of FIG. 4 showing only the upper portion of the drum;

FIG. 4 is a top plan view of the filling head with certain parts removed for clarity of illustration;

FIG. 5 is a vertical section on a large scale showing the filling nozzle and valve in vertical section; and FIG. 6 is a fragmentary view through the sealed filling opening of the drum after it has been filled, the view being a vertical section.

Referring to the drawings, 2 designates a filling head adapted to fit over the end of drum 3 which may be a steel drum of conventional form with a bottom and a top 4 which preferably has a central filling opening rather than one closer to the rim, but the apparatus may be made for use with either form. The filling opening is provided by an internally threaded bushing 5 hermetically sealed into the top of the drum in any suitable manner. The drum is supported for filling on an inclined roller conveyor 6 down which it may be rolled, after which it is filled, and on which it rests with its vertical axis inclined away from a vertical position. Over the filling head there is a fixed supporting structure 7.

The filling head 2 comprises a rigid central plate 8 with a peripheral flange 8a, the diameter of the head being such that it may be easily positioned over the end of the drum. Eccentrically positioned on the plate 8 are upstanding ears or lugs 9 through which a pivot pin 9a passes, this pivot also passing through the lower end of a piston rod 10 which has a piston (not shown) movable vertically in a cylinder 10a supported on the fixed frame structure 7. The filling head may be raised and lowered by operation of the piston in the cylinder, and because of the head being pivoted to move in a vertical arc, it may seat squarely on the end of the tilted drum. Because of the pivot or hinge connection being off center, one edge normally hangs lower than the other when the head is raised, and to limit the angle to which it may tilt, an arm 11 extending horizontally from the piston rod is provided, and it has a downwardly-projecting abutment or pin 11a. When the head is on the drum, it is clear of this abutment, but when it is lifted clear of the drum, the head will contact the abutment and thereby limit the angle to which the head can tilt. There is a gasket 12 on the under side of the head adjacent the flange 8a which engages the bead of the countersunk top 4 of the drum.

The head plate 8 has an opening 13 therethrough which registers with the filling opening in the drum and is of larger diameter than the bushing or collar 6. Provision is made for constantly supplying steam to the under side of the filling head when it is engaged with a drum. For this purpose two pipes 14 at diametrically opposite points in the head are shown, each being connected through flexible tubing 14a with a steam line 14b.

There is a movable closure plate 15 on top of the plate 8, and it is hinged thereto at 15a to swing in a vertical arc, this hinge being transverse to the hinge or pivotal connection at 9a so that while the head tilts to conform to the slope of the drum, the plate 15 swings in an arc crosswise of the slope of the head. It normally closes the opening 13. Passing through and welded onto this plate is the filling valve assembly designated generally as 16, and which is hereinafter more fully described. In its operating position the lower end of this filling valve projects into the filling opening of the drum, but at other times it may be swung up out of the way. There is also a short guide tube 17 passing through this movable cover plate alongside the filling tube assembly.

As the first step in filling the drum after the filling head has been positioned over the top of the drum, steam is supplied to the space under the head above the top of the drum through pipes 14. A suction lance 18 in the form of a slender tube is inserted through the tube 17 and collar 6 of the drum and it extends to the very bottom of the drum. It is slightly curved so that it reaches to the lowest point in the interior of the tilted drum. Its upper end is connected through flexible tubing 19 to a suction line and suction pump (not shown). Through this lance, air is exhausted from the interior of the drum and the air is replaced by steam flowing in through the bushing 6. The drum is of course cold, and as steam is drawn into the drum through the filling opening the steam initially condenses. The condensate so formed drops or flows to the low point in the bottom of the drum and is also drawn out through the lance 18. As this procedure continues, using the lance to withdraw air and condensate and induce the flow of steam into the drum, the drum becomes hot, condensate is reduced, and the interior of the drum and any remaining air is sterilized. The point of safe sterilization will usually be reached after a definite time interval, but may be most accurately determined by measuring the temperature of the exterior of the drum. I have found that with steam at atmospheric pressure under the filling head ten minutes assures complete sterilization, so that once sterilizing time has been determined it is possible to rely on a timer to signal the operator when the drum is ready for filling. The operator usually opens the stream supply lines fully when the drum is cold, and decreases the flow as the drum heats and condensation decreases. The steam is regulated so that there is always evidence of escaping steam around the filling head.

After sterilization has been completed, the filling of the drum follows. First the suction lance is withdrawn, but steam continues to flow through the pipes 14 to the space under the plate 8 and over the top of the drum so that air-borne organisms cannot survive and steam will continuously escape through the guide tube 17 from which the lance has been removed.

The filling tube assembly designated generally as 16 is shown in detail in FIG. 5. It comprises a vertical tube portion 20 which passes through the hinged cover 15 and is welded thereto. It has a laterally-extending upper end portion 21 to which a flexible product supply tube 22 is attached, this tube connecting with a product supply line 22a. Extending vertically through the tube 20 is a valve stem 23 that passes through the curve at the upper end of the tube 20 into a tubular extension 24 welded onto the tube 20. The valve stem has an enlarged extension 25 at its upper end which continues up through a sleeve 26 welded to the top of the extension 24. A bushing 27 is screwed into the top of the sleeve 26 and the enlarged extension 25 of the stem passes up through this bushing. O rings 28 provide a seal around the enlarged portion of the stem to prevent steam from entering the filling nozzle around the valve stem.

The bushing 27 has a sleeve 29 secured thereto and projecting upwardly therefrom, and this sleeve supports a valve-operating mechanism which, for simplicity, is here illustrated as a double-acting air cylinder 30 having a piston 31 that is coupled to the valve stem through a connection 32.

The valve itself is a pear-shaped or falling drop-shaped stopper 33 carried on the lower end of the valve stem 23, and which seats, when the valve is closed, against the beveled end 20a of the tube 20. The air cylinder has its upper end provided with an air inlet nipple 34, and at the lower end is an air inlet nipple 35. 36 indicates an electromagnetic valve for controlling the supply of air to the nipple 34 from an air supply pipe 37, the valve 36 being a three-way valve so that when the valve is open for the flow of air from pipe 37 to the nipple 34, passage to the atmosphere is closed, but when this valve is closed to the flow of air from pipe 37, nipple 34 is vented to the atmosphere. Nipple 35 is provided with a similar electromagnetic valve 38, and 39 designates an air supply pipe. When valve 36 is open to admit air to the top of the cylinder, valve 38 is closed to air under pressure from pipe 39 and is vented to atmosphere. When valve 38 is opened for the passage of air from pipe 39 to the lower end, cylinder valve 36 is closed and vented to the atmosphere. By controlling the valves 36 and 38 the piston 31 can be raised and lowered. In the drawing it is shown in its raised position. When valve 36 therefore is operated to drive the piston 31 down, the valve 33 will move away from the seat 20a and allow the product to be charged into the drum to flow through the filling nozzle into the interior of the drum. Valve 38 is usually open to the flow of air from pipe 39 at all times except when valve 36 is open to its air supply, so that it will continuously hold the valve element against its seat except when a drum is being filled. A similar result may be used by supplying high pressure air through valve 36 while continuously supplying air at a lower pressure to nipple 35 so that an electromagnetic valve is not necessary. Other valve-operating mechanisms may be used including, for example, fluid pressure to open the valve and a spring to close it.

The shape of the valve element 33 is quite important, in that it produces a streamline flow with the product flowing over its surface and uniting at the bottom of the valve into a solid smooth stream with practically no spraying or spreading of the stream as it falls from the valve. The rate of flow should be regulated so that ordinarily the drum will be filled in not more than four minutes. With tomato pulp it has been found that four minutes is about the maximum filling time for a fifty gallon drum, and it has been found that a flow rate of twenty-five gallons per minute is very satisfactory.

When the stream of product to be charged into the drum initially hits the bottom of the drum, there will be an instant when it will splash and spread out over the bottom of the drum to momentarily condense some volume of the steam in the drum, but after there has been a slight depth of perhaps half an inch or so of product accumulated in the bottom of the drum, the stream will simply fall as a solid stream and quietly diffuse into the center of the accumulated material so that there will be very little heat exchange between the product and the atmosphere of stream in the drum. Consequently the amount of condensation that occurs after the first minute or so of flow is negligible.

It might be explained that most food products are heat-sensitive, and in most cases with juices or pulp such as tomato juice or tomato paste, the product itself will be cold at the time that it is introduced into the drum, because it would take far too long for the product to cool if it were introduced into the large drum at a sterilizing temperature. Consequently the flow of the cold product into the drum as a solid stream and its quiet diffusion into the center of the accumulating mass in the drum is important to minimize condensation, and for this reason also a short time for filling is important.

During the entire operation of filling the drum, steam will continue to be supplied over the top of the drum through the pipes 14 so that as any condensation occurs, more steam will be drawn into the drum and atmospheric air cannot enter, or at least cannot enter at a temperature under which air-borne organisms could survive. The escape of steam from around the filling head actually forces air away from any area where it might otherwise enter.

It will be noted that the sleeve 26 in the assembly above described is spaced from the enlarge extension 25 of the valve stem. A flexible tube 40 is connected to the source of steam supply 14b whereby a biological seal of steam is maintained around the valve stem between the two O-rings 28 so that if there should be leakage of air, such air will be sterilized, or leakage will occur from around the valve stem to atmosphere, rather than from the atmosphere inwardly. A petcock has been indicated at 41, which may be opened to drain condensate and allow a continuous controlled stream of steam to flow through the biological trap.

When the drum has been filled, the fluid pressure cylinder and piston arrangement 30 is operated to move the valve 33 to closed position by the admission of operating fluid from line 39 through valve 38. This may be accomplished through a liquid level switch (not shown) so as to prevent overfilling of the drum. After the valve 33 is closed, the hinged cover 15 is swung back to an upright position while steam continues to be supplied from pipes 14 through tubes 14a from supply line 14b to the area over the top of the drum and under the filling head. When the hinged cover 15 is opened, an atmosphere of steam will flow out of the opening 13, preventing the access of atmospheric air to the bushing 5 of the drum. A sterile sealing plug is then inserted through the opening 13 while steam is still enveloping the top of the drum. The plug, being inserted through the atmosphere of steam, remains sterile. It is screwed tightly into the bushing to close the filling opening in the drum and hermetically seal it. When this has been done the lifting head is raised and the drum is moved off the roller table support.

As a precaution against possible leakage of air during storage, the sealing plug 50, as shown in FIG. 6, is formed with an upstanding peripheral side wall 51 providing an upwardly-opening cavity. The top edge of the wall 51 is turned outwardly to provide a lip 53. A sealing gasket 54 is confined between this lip and the interior top edge of the bushing 5. The interior of the plug has a generally U-shaped cleat 55 welded therein. A closed end wrench with a rectangular opening is applied to this cleat to tighten the plug as soon as the filling head is lifted off the drum. The recess or cavity 52 in the cap is then filled with a sterilizing liquid, such as alcohol, and a seal 56 is pressed into place over the plug and it has an annular gasket 57 on its under surface that seals against the rim of the plug. The alcohol confined in the cavity will contact both gaskets 53 and 57 to maintain a sterile environment around the sealed areas to further protect the contents of the drum from possible contamination.

The invention provides an arrangement wherein an atmosphere of steam is maintained over the drum from the beginning of the time of sterilization to the final closing of the drum. This steam is under sufficient pressure so that escape is always from the space between the plate 8 and the drum to the atmosphere. The use of the suction lance 18 accomplishes the initial removal of original air in the drum and its replacement partially or entirely with steam, while the steam sterilizes the interior of the drum and any air which is not removed. As explained above, the product is introduced into the drum in such a manner as to minimize the condensation of steam and the level of the product rises quietly and with little turbulence or spraying of the product as the drum is being filled, and thereby assures minimum condensation of steam into the product. The slight amount of water of condensation that does form during the filling is on the surface of the product and the cavitation that occurs where the descending stream enters the surface of the accumulated product will carry most of this water into the product where it will diffuse and avoid a condition where spoilage might occur due to the presence of water of low acidity over the surface of the product.

While I have illustrated and described a specific apparatus, it will be understood that various changes and modifications may be made in the apparatus, and that times and temperatures may be varied according to the nature of the product and the rate of filling, all within the contemplation of my invention and under the scope of the following claims.

I claim:

1. The method of aseptically filling a drum with a flowable liquid which comprises
    confining the top end of the drum in which there is a filling opening against a filling head with a space between the end of the drum and the filling head and with an opening in the filling head registering with the filling opening in the drum,
    introducing steam into the space between the end of the drum and the filling head, entering a suction lance into the drum through the registering openings in the filling head and the drum, the lance extending to the bottom of the drum and withdrawing air from the drum and inducing a flow of steam from said space into the drum and at the same time withdraw condensate from the bottom of the drum,
    continuing the flow of steam and the removal of the condensate through the lance until the interior of the drum and its atmosphere are sterile and then withdrawing the suction lance while continuing to supply steam to said space between the filling head and the drum,
    then supplying the flowable liquid to the drum through a tube entered through said registering openings until the drum has been filled,
    removing the filling tube from said openings while still continuing said steam supply to the space between the drum and filling head,
    finally inserting a closure through the filling head into the filling opening of the drum while the atmosphere of steam is maintained to aseptically seal the opening, and thereafter removing the drum from under the filling head.

2. The method of aseptically filling a flowable product into a drum having an upper end wall with a filling opening therein, which method comprises
    confining the upper end of the drum against a filling head which has an opening therein over the filling opening in the drum with a space between the upper end wall of the drum and the filling head,
    flowing steam into said space when the end of the drum has been so confined and thereafter maintaining a continuous flow of steam in said space throughout the herein-defined steps until the filling opening has been closed, said steps comprising:
        inserting a suction lance into the drum through the filling head opening and filling opening and withdrawing air and condensate therefrom and inducing a flow of steam into the drum from said space until the interior of the drum and its atmosphere are sterile,
        withdrawing the lance and introducing the flowable liquid into the drum through a filling tube entering through the filling head into the filling opening in the drum until the drum has been filled,
        removing the filling tube from the opening in the cover plate,
        inserting a closure through the opening in the cover plate into the filling opening in the drum to seal said opening,
        and then removing the drum from engagement with the cover plate.

3. The method as defined in claim 2 of aseptically filling a drum wherein the opening in the cover plate is kept closed against a substantial escape of steam through the opening until the drum has been filled.

4. The method as defined in claim 2 of aseptically filling a drum wherein the flowable product is cold relative to the temperature of the steam and is introduced into the drum as compact, solid, free-falling stream.

5. The method defined in claim 2 wherein the drum is held with the bottom in a sloping plane and with the lance reaching inside the drum to the lowest point of the bottom.

6. Apparatus for aseptically filling a shipping and storing drum with a flowable product wherein the drum has a top, a bottom and side walls and the top has a filling opening therein designed to receive a closure after the drum has been filled, said apparatus comprising:

a drum support for supporting the drum with the top end up, a filling head adapted to engage the top of the drum and provide an enclosed space between the top of the drum and the under side of the filling head with the opening in the drum within said space, means for effecting relative vertical movement between the filling head and the drum for bringing the filling head into cooperative engagement with the drum, said filling head having an opening therethrough adapted to afford access to the filling opening in the drum when the filling head is engaged with the drum, a cover plate for said opening in the filling head movable into and out of position over said opening, a filling nozzle on the cover plate positioned to project through the filling head into the filling opening in the drum when said cover plate is in position over the opening in the filling head, means for controlling the flow of flowable product from the filling nozzle, said cover plate also having an opening therethrough alongside the filling nozzle through which a tubular lance may be inserted from above the filling head into the filling opening in the drum, a suction lance adapted to be inserted through said opening in the cover plate, and means for supplying steam to the space under the filling head and the drum during the time the filling head is engaged with the top of the drum.

7. Apparatus for aseptically filling drums as defined in claim 6 wherein said means for effecting relative vertical movement between the drum and filling head comprises operating means for raising and lowering the filling head.

8. Apparatus for aseptically filling drums as defined in claim 6 wherein said means for effecting relative vertical movement between the drum and filling head comprises operating means for raising and lowering the filling head, the filling head being pivotally suspended from said operating means to swing in a limited vertical arc, the drum support being constructed to hold the drum tilted from a vertical position, the pivotal suspension of the filling head adapting it to the inclination of the drum, said lance being shaped to reach the lowest point inside the bottom of the drum when the drum is so tilted.

9. Apparatus for aseptically filling drums as defined in claim 6 wherein said means for controlling the flow of flowable product from the filling nozzle comprises a valve element movable axially of the nozzle from a closed position against the end of the nozzle to an open position spaced from said end, said valve element being contoured to effect a flow from the nozzle which is a solid stream in contrast to a spreading one.

10. Apparatus for aseptically filling drums as defined in claim 9 wherein said valve is carried on an operating stem extending axially of the nozzle and projecting through an enclosure on the nozzle in which it has a sliding seal, operating means for moving the stem positioned externally of the nozzle, and means providing a steam circulating chamber around the stem between said enclosure and the operating means.

References Cited

UNITED STATES PATENTS

| | | | |
|---|---|---|---|
| 2,984,057 | 5/1961 | Bellato | 99—182 X |
| 3,026,791 | 3/1962 | Wegener | 53—112 X |

TRAVIS S. McGEHEE, *Primary Examiner.*